April 11, 1961 P. TOTH 2,979,710
AUTOMATIC MEASURING APPARATUS
Filed Sept. 25, 1959 4 Sheets-Sheet 1

Inventor
Peter Toth
By: Michael S. Strike
Attorney

April 11, 1961 P. TOTH 2,979,710
AUTOMATIC MEASURING APPARATUS
Filed Sept. 25, 1959 4 Sheets-Sheet 2
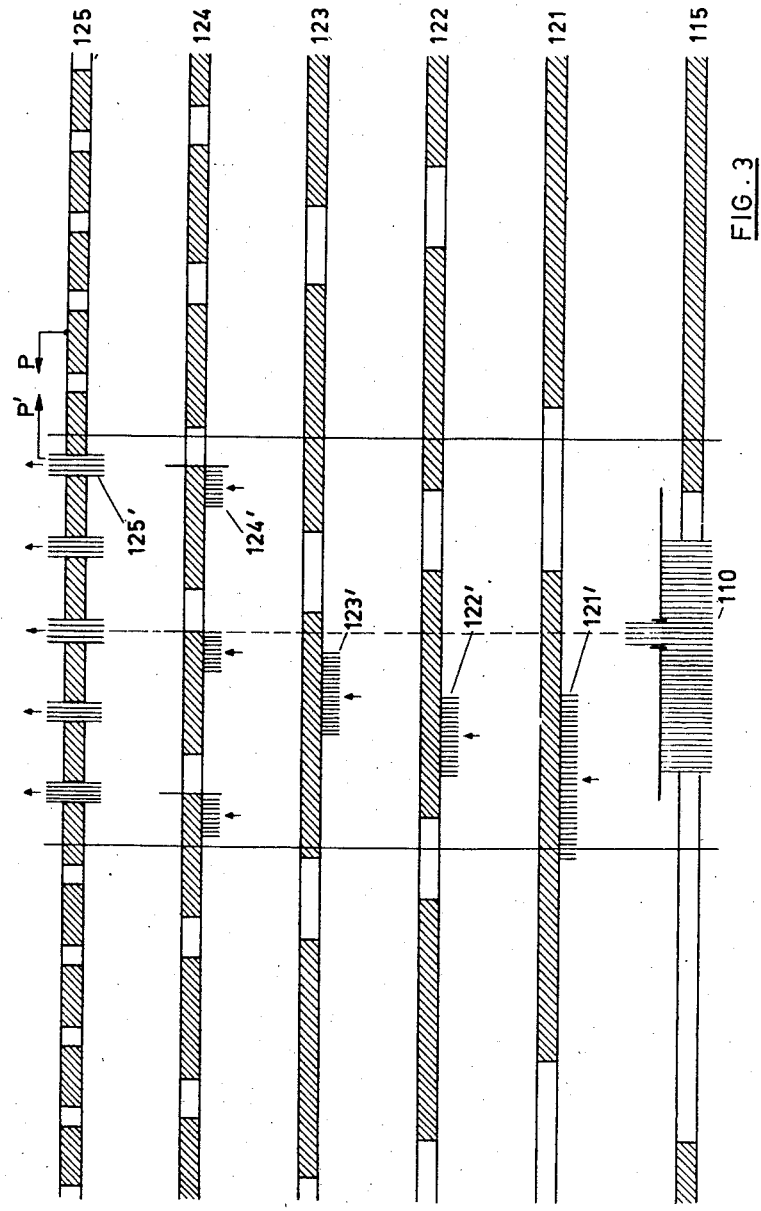

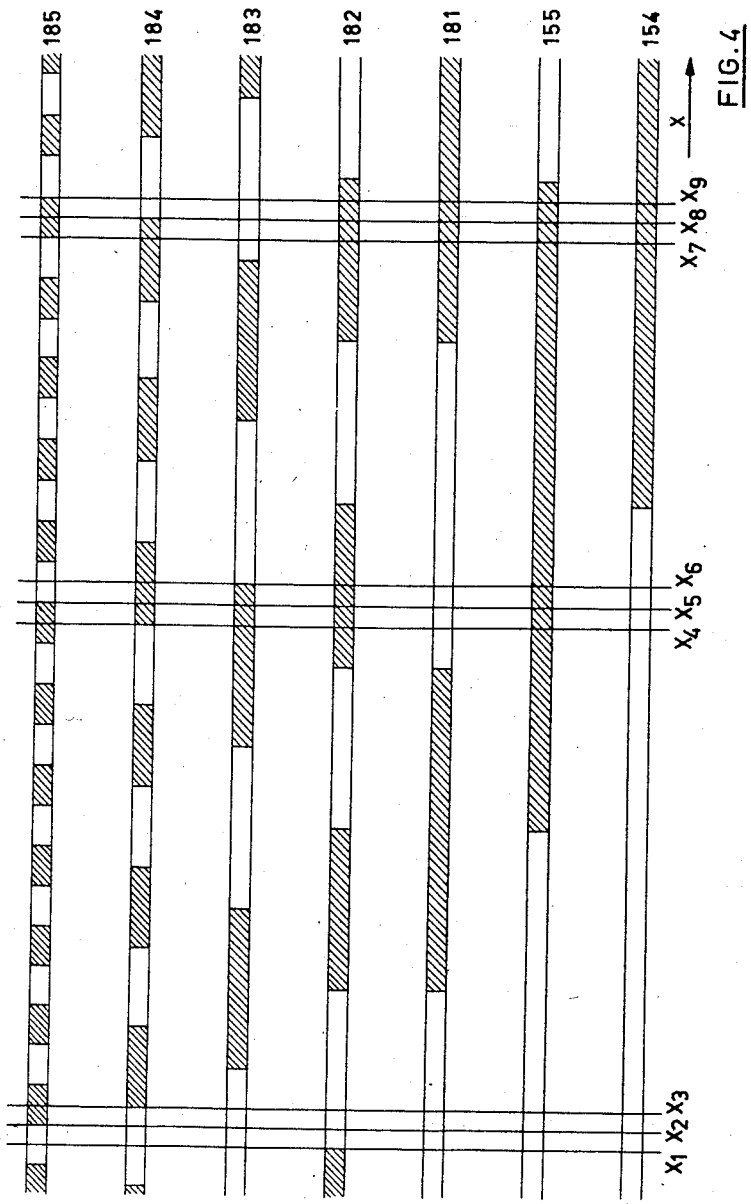

April 11, 1961 P. TOTH 2,979,710
AUTOMATIC MEASURING APPARATUS
Filed Sept. 25, 1959 4 Sheets-Sheet 4
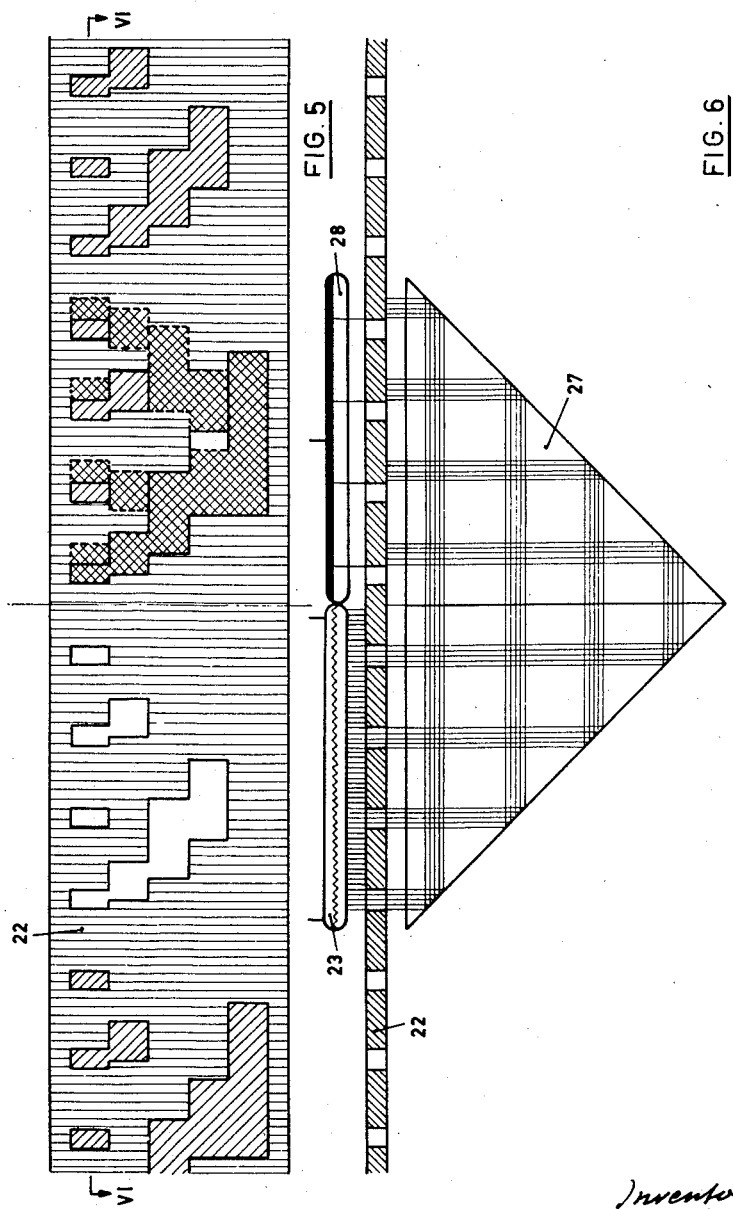
Inventor
Peter Toth
By: Michael S. Striker
Attorney

United States Patent Office 2,979,710
Patented Apr. 11, 1961

2,979,710

AUTOMATIC MEASURING APPARATUS

Peter Toth, Ruschlikon, Switzerland, assignor to Contraves A.G., Zurich, Switzerland Filed Sept. 25, 1959, Ser. No. 842,245

Claims priority, application Switzerland Sept. 25, 1958

20 Claims. (Cl. 340—347)

The present invention relates to automatic measuring apparatus, and more particularly to apparatus for automatically expressing the relative position of two elements in digital values.

Apparatus of this type is known, wherein a code member moves with one of the elements. The code member has transparent areas constituting a graduation, and the position of the code member is determined by photocells receiving light passing through the transparent areas of the code member.

Automatic measuring apparatus of this type according to the prior art permits only rather coarse measurements, and it is one object of the present invention to improve the apparatus of the prior art, and to provide automatic measuring apparatus capable of micrometric measuring operations.

Another object of the present invention is to provide automatic measuring apparatus employing electrical and optical means for carrying out measuring operations previously only obtained by measuring apparatus employing a microscope for reading the graduations.

Another object of the present invention is to provide apparatus for expressing in digital values arcs of one second length, and distances of one micron.

Another object of the present invention is to provide micrometric apparatus of this type in which the result values are obtained in the form of electric impulses capable of evaluation in electronic apparatus.

Another object of the present invention is to provide automatic measuring apparatus capable of carrying out micrometric measuring operations and suitable to be combined with conventional apparatus of this type carrying out coarse measuring operations.

A further object of the present invention is to provide measuring apparatus of this type of simple construction whose results are not falsified by dust since the average of several photo-electric readings is evaluated.

With these objects in view, the measuring apparatus of the present invention has encoding means comprising a first element and a second element movable relative to each other in one direction; a code member supported on the first element and having a set of graduation sections of uniform length; optical means supported on the second element and optically connecting at least two spaced sections; a source of light on the second element for projecting light on one of the two spaced sections; and photo-detector means on the second element arranged spaced from the source of light and located in the region of the other section. Each section has a light-permeable area and an opaque area which are alternately arranged so that light passes through a light-permeable area of one of the two sections is projected by the optical means to form an image of the respective light-permeable area on the other section whereby the photo-detector means receive the light of the image only where the same is superimposed on the light-permeable area of the other section. The light received by the photo-detector means is a measure of the relative displacement of the first and second elements, and is transformed by the photo-detector means, for example a multi-element photoconductor, into electric impulses which are evaluated in a known manner by a data converter.

In the preferred embodiment of the present invention, the code disk is rotatable, and has a plurality of sets of graduation sections arranged in circles concentric with the axis of rotation of the code disk. The optical means is a prism located on one side of the code disk, while the light source is a gas-discharge tube having a very short flash duration cooperating with a multielement photoconductor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a diagram illustrating in linear form the relative positions of several sets of graduation sections including light-permeable and opaque areas;

Fig. 4 is a diagram illustrating in linear form the code for the photo-detector for reading out coarse and fine graduation sections;

Fig. 5 is a fragmentary schematic plan view of a code member used in a modified embodiment of the present invention which is advantageously applied to measure the rectilinear motions of the carriage of a machine tool; and Fig. 6 is a fragmentary schematic longitudinal sectional view of the arrangement which is schematically illustrated in the fragmentary Fig. 5.

Figure 1:
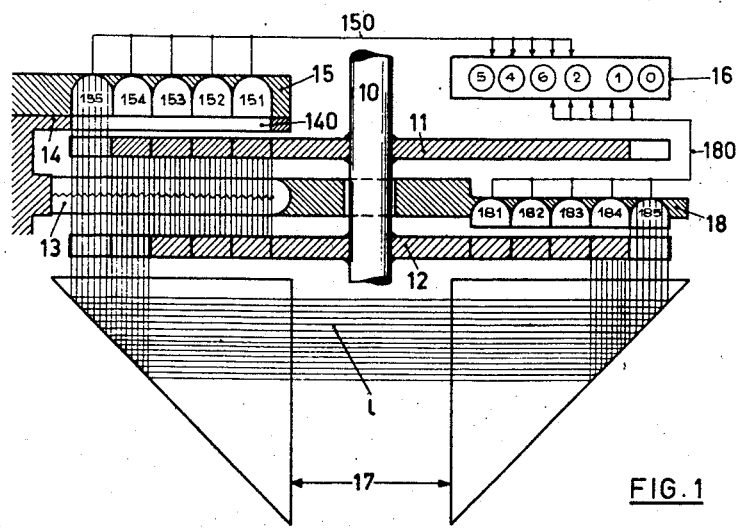
Fig. 1 is a fragmentary schematic sectional view illustrating a measuring apparatus including a conventional coarse encoding system combined with a fine encoding system according to the present invention.
Figure 2:
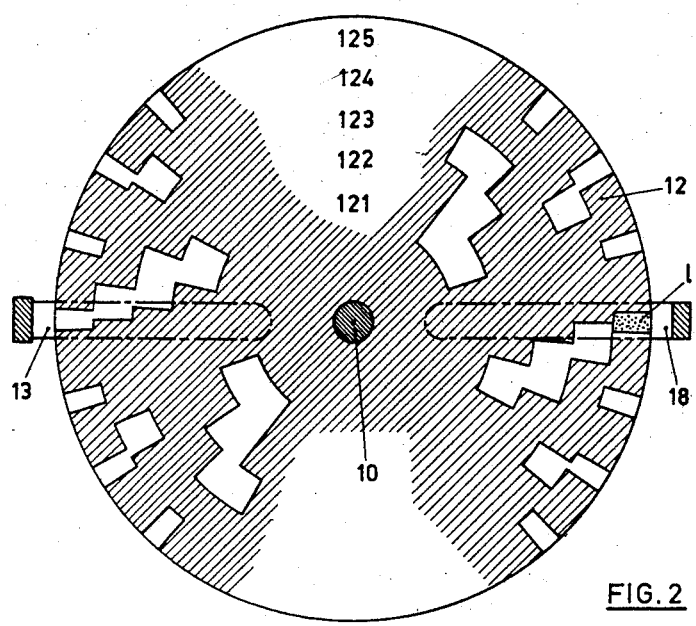
Fig. 2 is a fragmentary schematic plan view of a code disk according to the present invention, of a light source, and of a photo-detector.

Referring now to the drawings, and more particularly to Figs. 1 and 2, a rotary shaft 10 is turnable relative to a fixed element, and it is the object of the arrangement to exactly measure the angular displacement of the shaft relative to the fixed element, as may for example be required for measuring the azimuth angle of a theodolite.

Shaft 10 fixedly carries two code disks 11 and 12. Code disks 11 and 12 are transparent clear glass plates which are covered on one side by an opaque layer, portions of which have been removed to form light-permeable areas of a selected shape and arrangement. For the sake of clarity, the light-permeable areas are illustrated in the schematic drawing as cutouts or windows in the code disks. Code disk 11 serves for coarse measuring operations and is provided with concentric rings of sets of sections, each of which includes a light-permeable clear area and an oquaque area. The rings are of equal radial width. The sections of the different sets are of different length, and the two innermost rings are formed by a single sector, so that the light-permeable area extends through 180°. The opaque area also extends through 180°. Twice as many sections are provided in the next ring which contains two sections, and two light-permeable areas, each extending to 90° and alternating with the two opaque areas.

A source of light 13 is supported by the fixed element, and is located on one side of code disk 11 to throw flashes of light through a narrow sector of code disk 11. On the other side of code disk 11, an opaque mask 14 is supported on the fixed element and has a radial slit 140 which extends in radial direction over the code rings, or sets of sectors of disk 11. The width of the slit 140 must be substantially smaller than the circumferential length of the light-permeable areas of the graduation sections of the outermost code ring which has the finest graduations. A carrier 15 for a photo-detector is mounted on the fixed element above the slit system 14, and includes a plurality of photocells 151, 152, 153, 154 and 155 which are respectively located in the regions of the code rings and sets of sectors. The photo-detector is preferably a multielement PbS photoconductor whose cells produce electric impulses when receiving light. Each photocell determines whether the respective associated radial part of slit 140 receives light from the source of light 13 through a light-permeable area of code disk 11.

Each photocell is connected with an electronic data converter 16 by a conductor 150. The data converter 16 determines the combination of illuminated and non-illuminated photocells, evaluates the result, and indicates it in digital form, for example as a decimal number. The combination of illuminated light-permeable areas is different for each angularly turned position of code disk 11, so that the result can be read out without any ambiguity.

Fig. 1 shows only five code rings for the sake of clarity, but actually up to 13 code rings can be provided. Since the length of the light-permeable areas becomes smaller for each added code ring, the accuracy of the reading is limited by the width of the slit 140. Furthermore, a certain eccentricity cannot be avoided, the slit mask cannot be mounted with such exactness, and the resolving power of the photocells do not permit the reading out of values less than one minute unless code disks of particularly great diameter are provided. An encoding system of the above described type may have 2048 sections in the outermost code ring, which corresponds to measurable units of 2.7 minutes, assuming a slit width of 0.04 mm. The above described arrangement is known, and not an object of the present invention. A corresponding arrangement is described in detail in the following publication: I.R.E. Transactions on Instrumentation, P.G.I.–5 (1956), pages 168–173. An article by W. I. Frank et al., entitled "Precision Shaft-Position Encoders," describes a known encoding system employing a 13-channel code disk, and the corresponding apparatus for obtaining data conversion. A fine-reading device is also described in the above article, and includes a fine-reading code disk geared to the coarse reading code disk.

In accordance with the present invention, the second code disk 12 is used for fine measuring, and is provided with concentric code rings, in each of which a set of graduation sections including light-permeable and opaque areas, is provided. Precision ruling machines as are used for making optical rulers, are capable of subdividing a ring-shaped area of 360° into 262,144 sections ($2^{18}$), each of which includes a light-permeable area and an opaque area. In Figs. 1 and 2 only five code rings 121 to 125 are schematically illustrated on an enlarged scale. The opaque areas are indicated by hatching, and the light-permeable areas appear as white fields in the hatched areas.

The code system applied in the code rings 11 and 12 corresponds to the following table:

| Set of Sections $n$ | Number of Sections $2^n-1$ | Arc Length of Light-Permeable Area $360°:2^n$ | | | Length in Microns of Light-Permeable Area for a Code Disk Having an Outer Diameter of 200 mm. |
|---|---|---|---|---|---|
| 1 | 1 | 180° | | | |
| 1 | 1 | 180° | | | |
| 2 | 2 | 90° | | | |
| 3 | 4 | 45° | | | |
| 4 | 8 | 22° | 30′ | | |
| 5 | 16 | 11° | 15′ | | |
| 6 | 32 | 5° | 37′ | 30″ | |
| 7 | 64 | 2° | 48′ | 45″ | |
| 8 | 128 | 1° | 24′ | 22″ | |
| 9 | 256 | | 42′ | 11″ | |
| 10 | 512 | | 21′ | 5″ | |
| 11 | 1,024 | | 10′ | 32″ | |
| 12 | 2,048 | | 5′ | 16″ | 160μ |
| 13 | 4,096 | | 2′ | 38″ | 80μ |
| 14 | 8,192 | | 1′ | 19″ | 40μ |
| 15 | 16,384 | | | 38″ | 20μ |
| 16 | 32,768 | | | 19″ | 10μ |
| 17 | 65,536 | | | 9″ | 5μ |
| 18 | 131,072 | | | 4½″ | 2½μ |
| 19 | 262,144 | | | 2½″ | 1¼μ |

In accordance with the present invention, the coarse code disk 11 is used for the first ten or twelve code rings, whereas the fine code disk 12 is used for additional eight to ten code rings.

The fine code disk 12 is arranged below the light source 13, and an optical prism means 17 receives the light passing through the light-permeable areas of code disk 12 and projects it on the corresponding sections of disk 12 which are located diametrically opposite the sections on which the light falls. It is apparent that light falling through a light-permeable area of a section of code ring 125 will produce an image of this light-permeable section on the corresponding diametrically opposite section of code ring 125, so that the image may be partly superimposed on the light-permeable area of such diametrically opposite section. A photo-detector system 18 is provided on the fixed element diametrically opposite the source of light 13, and includes a plurality of radially arranged light-sensitive means 181 to 185, each of which is located in the region of one of the code rings, and cooperates with one circular set of graduation sectors. A plurality of conductors 180 connects the photocells with the data converter 16 where the respective combination of illuminated and non-illuminated photocells of the system 18 is evaluated. Such combination is different for each turned position of code disk 12, and is obtained by the superposition of an image of a light-permeable area on the light-permeable area located directly under the respective photocell. The impulses of the photo-detector 18 are evaluated together with the impulses of the photo-detector 15 to obtain a result in digital form, for example as a decimal number representing the angle of displacement of the turnable element, which is connected to shaft 10, relative to a fixed element on which the photo-detectors, the source of light, and the optical prism are supported.

Referring now to Fig. 3 a code applied on code disk 12, and the effect of such code will now be explained. The code rings, and sets of graduation sections 121, 122, 123, 124 and 125 of disk 12 are illustrated as linear sections together with the outermost code ring 115 of the coarse code disk 11. The beams of light 125′, 124′, 123′, 122′ and 121′ are projected by the optical prism means in the form of images of the diametrically opposite illuminated light-permeable areas and fall on the respective sections of the code rings. In the condition of Fig. 3, which corresponds to the condition illustrated in Figs. 1 and 2, the bundles of light 125′ fully fall through an associated light-permeable area of the same code ring 125, so that the respective associated photocell 185 responds to the condition "light." In the other code rings, the bundles of light fall onto the opaque areas of the respective sections, so that the associated photocells indicate the condition "dark."

Due to the mirror-symmetric arrangement, the bundles of light travel in a direction opposite to the turning direction of the code disk, as indicated by the arrows P and P'. In the position of Fig. 3, the code ring 124 is so located that the bundle of light falls on the opaque area of the respective section directly adjacent the light-permeable area, which is a transition condition, since the slightest movement of the disk in direction of arrow P, and of the bundle of light in the direction of arrow P' will result in illumination of the photocell 184 associated with code ring 124. The condition "light" is maintained until disk 12 turns an angle corresponding to the length of the light-permeable area of the respective set of graduation sections.

Fig. 4 is a diagram showing the reading out code of the photo-detector 18 in combination with the photo-detector 15 representing the conditions prevailing in the embodiment of Figs. 1 and 2. Basically, the arrangement is a reflected binary code system with a control correction code in the code ring under the photocell 181 for associating the value measured by the coarse photo-detector 15 with the value measured by the fine photo-detector 18.

In the following table, the respective combinations of illuminated, and non-illuminated photocells is given for a number of abscissas $x_n$.

| Photocell | $x1$ | $x2$ | $x3$ | $x4$ | $x5$ | $x6$ | $x7$ | $x8$ | $x9$ |
|---|---|---|---|---|---|---|---|---|---|
| 185 | 0 | 0-1 | 1 | 1 | 1-0 | 0 | 0-1 | 1 | 1-0 |
| 184 | 0 | 0 | 0-1 | 0-1 | 1 | 1 | 1 | 1-0 | 0 |
| 183 | 0 | 0 | 0 | 1 | 1 | 1-0 | 0 | 0 | 0 |
| 182 | 1-0 | 0 | 0 | 1 | 1 | 1 | 1 | 1 | 1 |
| 181 | 0 | 0 | 0 | 0 | 0 | 0 | 1 | 1 | 1 |
| 155 | 0 | 0 | 0 | 1 | 1 | 1 | 1 | 1 | 1 |
| 154 | 0 | 0 | 0 | 0 | 0 | 0 | 1 | 1 | 1 |

$\Sigma=1$ even.

In the above table, 0 indicates illumination, 1 indicates non-illumination, and 0-1 indicates a transition condition.

From the above examples it will become apparent that a single code combination is associated with each abscissa, and that only one of the binary code sections varies to obtain a new combination.

The control code of photocell 181 renders it possible to eliminate the effect of the permitted tolerances of the coarse code disk 11. The sum of the illuminated photocells of the photo-detector 15, and of the photocells 181 and 182 must be an even number. If such sum is odd due to the tolerances of the coarse code disk 11, the read out value must be corrected by one unit. A unit must be added if photocell 182 is not illuminated, and a unit must be subtracted when photocell 182 is illuminated. The data converter 16 may be provided in a known manner with means for automatically carrying out the necessary correction.

In the embodiment illustrated in Figs. 5 and 6, not an angle, but a distance is measured. For example, a glass code member 22 is secured to the carriage of a machine tool, and moves with the same in longitudinal direction along a rectilinear path. The code member 22 is coded similar to the arrangement described with reference to the turnable code member 12 shown in Figs. 1 and 2. On the fixed element of the machine tool, the source of light 23, optical prism means 27, and a photo-detector 28 is provided. Light falling from a source of light 23 onto light-permeable areas of code member 12 will be projected by prism 27 on the corresponding sections of the same set of sections, and form an image of the light-permeable area on such section. Where the respective light-permeable area underneath photo-detector 28 is lighted by the image, the respective photocell will be illuminated. The photo-detector 28 responds to the combination of illuminated and non-illuminated areas.

The schematic illustration of Fig. 5 shows that the photo-detector 28 extends in transverse direction with respect to code member 22, and a group of photocells are arranged in a transverse row to respectively cooperate with the different sets of graduation sections shown along horizontal lines in Fig. 5. The source of light 23 also extends in transverse direction over several sets of sections.

In accordance with the present invention, the source of light, and the photo-detector extends also in longitudinal direction with respect to the code member 22, and each photocell extends over several sections of each set so that each photocell responds in one position of the code member to the light falling through several light-permeable areas of the respective set of sections. In this manner, a greater amount of light is received by the photo-detector in each position of the code member, and slight errors of the calibration of the code member 22 are prevented from influencing the result, since the photo-detector responds to an average of light obtained through several corresponding light-permeable areas of the same set of sections.

Evidently, the fine measuring arrangement shown in Figs. 5 and 6 can be combined with a conventional coarse measuring arrangement. The code used in the arrangement, and the construction of the optical means 17 and 27 can be adapted to the prevailing conditions.

The advantages of the present invention are mainly the following:

(1) Due to the superimposition of the image of a light-permeable area onto a diametrically opposite light-permeable area of the same turnable code disc, and eccentricity of the code disk has no effect, although extremely small graduations can be evaluated.

(2) Due to this fact, and due to the opposite movement of the light-permeable area of the code disk with respect to the image of the respective associated light-permeable area on which the light falls, the following additional advantage is obtained: At a predetermined number of sections of a code ring, the number of sections for the respective photocell is doubled, so that the power of resolution of the photocell is also doubled.

(3) Since the light-responsive means associated with each set of sections can be arranged to extend over a plurality of sections of the respective set, a substantially greater amount of light is available for a desired smallest measured unit, as compared with conventional arrangements, in which only the amount of light can be used which passes through a slit having a width not greater than the length of a light-permeable area of the set of sections having the finest graduations. As noted above, another advantage is that the tolerances of the graduations are averaged, and that inaccurate readings of single sections have no substantial influence on the result. Such inaccurate readings may, for example, be caused by dust covering light-permeable areas, or by fine scratches in the opaque layer.

The amount of light entering a photocell during movement of the code member depends on the length of each light-permeable area in direction of movement, and also on the shape of the light-permeable area. To enable the photocells to distinguish between the condition "light" and "dark," the length of the light-permeable areas must be smaller than half the length of the respective associated sections. On the other hand, the length of the light-permeable area must not be smaller than one quarter of the length of the respective section, in case that the photocell shall indicate the conditions "light" or "dark," respectively, for corresponding equal displacements of the code member. Since a photocell must receive a minimum amount of light in order to respond, which is necessary to distinguish the condition "light" from the condition "dark," the width of each light-permeable area must be slightly greater than a quarter of the length of the respective section.

For example, Fig. 3 shows the length of each light-permeable area to be a little over a quarter of the length of the section, and Fig. 2 shows a radial width of each light-permeable area to be greater than its circumferential length.

In the illustrated embodiments of the present invention, substantially rectangular light-permeable areas are shown. This arrangement produces a linear increase of the amount of light falling into a photocell between a transition situation, code ring 124 in Fig. 3, and a condition in which a light-permeable area coincides with a beam of light as shown for code ring 125 in Fig. 3, where a maximum amount of light enters the photocell. The amount of light received by the photocell decreases in accordance with the linear function, and becomes 0 until the next section becomes effective, as shown for code rings 121, 122, 123 in Fig. 3. By providing light-permeable areas of different shape it is possible to obtain a very rapidly increasing amount of light after a transition condition, and the amount of light can be kept constant for a time period whereupon it rapidly drops.

It will be understood that the number of code rings of the code disk 12 is selectable independent of the number of code rings of the coarse code number 11. There is no geometrical relation between the code rings of the two code members, however, the zero lines of the two code disks 11 and 12 must coincide.

It will be understood that each of the elements described above, or two or more together, may also find a useful application in other types of automatic measuring apparatus differing from the types described above.

While the invention has been illustrated and described as embodied in encoding means for a measuring apparatus employing photocells, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a measuring apparatus, in combination, encoding means comprising a first element and a second element, one of said elements being movable in one direction relative to the other element; a code member supported on said first element, said code member having a set of graduation sections of uniform length extending in said direction, each section having a light-permeable area and an opaque area, said light-permeable areas and opaque areas of said set of sections alternating in said direction; optical means supported on said second element on one side of said code member and optically connecting at least two spaced sections of said set of sections for projecting rays of light passing through the light-permeable area of each of said two sections onto the other of said two sections; a source of light supported on said second element on the other side of said code member in a position for projecting light on one of said two sections so that light passes through the light-permeable area of said one section and an image of the light-permeable area of said one section is formed by said optical means on the other of said two sections; and photo-detector means supported on said second element on said other side of said code member spaced in said one direction from said source of light and located in the region of said other section to receive the light of the image only where the same is superimposed on the light-permeable area of said other section so that the received light is a measure of the relative displacement of said first and second elements.

2. In a measuring apparatus, in combination, encoding means comprising a first element and a second element, one of said elements being movable in one direction on said first element, said code member having a set of graduation sections of uniform length extending in said direction, each section having a light-permeable area and an opaque area, said light-permeable areas and opaque areas of said sets of sections alternating in said direction; optical means supported on said second element on one side of said code member and optically connecting a plurality of pairs of spaced sections of said set of sections for projecting rays of light passing through the light-permeable area of each section of each pair onto the other section of each pair; a source of light supported on said second element on the other side of said code member in a position for projecting light on one section of each pair so that light passes through the light-permeable area of one section of each pair and an image of the light-permeable area of said one section is formed by said optical means on the other section of the respective pair of sections; and photo-detector means supported on said second element on said other side of said code member spaced in said one direction from said source of light and extending over a plurality of said other sections of said pairs of sections to receive the light of the images only where the same are superimposed on the light-permeable areas of said other sections so that the received light is a measure of the relative displacement of said first and second elements.

3. In a measuring apparatus, in combination, encoding means comprising a first element and a second element, one of said elements turnable relative to the other element; a code member supported on said first element, said code member having a set of graduation sections of uniform length extending in circumferential direction, each section having a light-permeable area and an opaque area, said light-permeable areas and opaque areas of said set of sections alternating in circumferential direction; optical means supported on said second element on one side of said code member and optically connecting at least two diametrically spaced sections of said set of sections for projecting rays of light passing through the light-permeable area of each of said two sections onto the other of said two sections; a source of light supported on said second element on the other side of said code member in a position for projecting light on one of said two sections so that light passes through the light-permeable area of said one section and an image of the light-permeable area of said one section is formed by said optical means on the other of said two sections; and photo-detector means supported on said second element on said other side of said code member diametrically spaced from said source of light and located in the region of said other section to receive the light of the image only where the same is superimposed on the light-permeable area of said other section so that the received light is a measure of the relative displacement of said first and second elements.

4. In a measuring apparatus, in combination, encoding means comprising a first element and a second element, said first element being a shaft turnable relative to said second element, said second element being a stationary support; a code member supported on said first element, said code member having a set of graduation sections of uniform length extending in circumferential direction, each section having a light-permeable area and an opaque area, said light-permeable areas and opaque areas of said set of sections alternating in circumferential direction; optical means supported on said second element on one side of said code member and optically connecting at least two diametrically spaced sections of said set of sections for projecting rays of light passing through the light-permeable area of each of said two sections onto the other of said two sections; a source of light supported on said second element on the other side of said code member in a position for projecting light on one of said two sections so that light passes through the light-permeable area of said one section and an image of the light-permeable area of said one section is formed by said optical means on the other of said two sections; and photo-detector means supported on said second element on said other side of said code member diametrically spaced from said source of light and located in the region of said other section to receive the light of the image only where the same is superimposed on the light-permeable area of said other section so that the received light is a measure of the relative displacement of said first and second elements.

5. In a measuring apparatus, in combination, encoding means comprising a first element and a second element, said first element being a shaft turnable relative to said second element, said second element being a stationary support; a circular code disk supported on said first element, said code disk having a circular set of graduation sections of uniform length extending in circumferential direction, each section having a light-permeable area and an opaque area, said light-permeable areas and opaque areas of said set of sections alternating in circumferential direction; optical means supported on said second element on one side of said code disk and optically connecting at least two diametrically spaced sections of said set of sections for projecting rays of light passing through the light-permeable area of each of said two sections onto the other of said two sections; a source of light supported on said second element on the other side of said code disk in a position for projecting light on one of said two sections so that light passes through the light-permeable area of said one section and an image of the light-permeable area of said one section is formed by said optical means on the other of said two sections; and photo-detector means supported on said second element on said other side of said code disk diametrically spaced from said source of light and located in the region of said other section to receive the light of the image only where the same is superimposed on the light-permeable area of said other section so that the received light is a measure of the relative displacement of said first and second elements.

6. In a measuring apparatus, in combination, encoding means comprising a first element and a second element, one of said elements being movable in one direction relative to the other element; a code member supported on said first element, said code member having a set of graduation sections of uniform length extending in said direction, each section having a light-permeable area and an opaque area, said light-permeable areas and opaque areas of said set of sections alternating in said direction; optical prism means supported on said second element on one side of said code member and having two spaced portions optically connecting at least two spaced sections of said set of sections for projecting rays of light passing through the light-permeable area of each of said two sections onto the other of said two sections; a source of light supported on said second element on the other side of said code member in a position for projecting light on one of said two sections so that light passes through the light-permeable area of said one section and an image of the light-permeable area of said one section is formed by said optical means on the other of said two sections; and photo-detector means supported on said second element on said other side of said code member spaced in said one direction from said source of light and located in the region of said other section to receive the light of the image only where the same is superimposed on the light-permeable area of said other section so that the received light is a measure of the relative displacement of said first and second elements.

7. In a measuring apparatus, in combination, encoding means comprising a first element and a second element, one of said elements being movable in one direction relative to the other element; a code member supported on said first element, said code member having a set of graduation sections of uniform length extending in said direction, each section having a light-permeable area and an opaque area, said light-permeable areas and opaque areas of said set of sections alternating in said direction; optical prism means supported on said second element on one side of said code member and having two spaced portions optically connecting a plurality of pairs of spaced sections of said set of sections for projecting rays of light passing through the light-permeable area of each section of each pair onto the other section of each pair; a source of light supported on said second element on the other side of said code member in a position for projecting light on one section of each pair so that light passes through the light-permeable area of said one section and an image of the light-permeable area of said one section is formed by said optical means on the other section of the respective pair of sections; and photo-detector means supported on said second element on said other side of said code member spaced in said one direction from said source of light and including a plurality of elements respectively located in the region of said other sections of said pairs of sections to receive the light of the images only where the same are superimposed on the light-permeable areas of said other sections so that the received light is a measure of the relative displacement of said first and second elements.

8. In a measuring apparatus, in combination, encoding means comprising a first element and a second element, said first element being a shaft turnable relative to said second element, said second element being a stationary support; a circular code disk supported on said first element, said code disk having a circular set of graduation sections of uniform length extending in circumferential direction, each section having a light-permeable area and an opaque area, said light-permeable areas and opaque areas of said set of sections alternating in circumferential direction; optical prism means supported on said second element on one side of said code disk and having two spaced portions optically connecting at least two diametrically spaced sections of said set of sections for projecting rays of light passing through the light-permeable area of each of said two sections onto the other of said two sections; a source of light supported on said second element on the other side of said code disk in a position for projecting light on one of said two sections so that light passes through the light-permeable area of said one section and an image of the light-permeable area of said one section is formed by said optical means on the other of said two sections; and photo-detector means supported on said second element on said other side of said code disk diametrically spaced from said source of light and located in the region of said other section to receive the light of the image only where the same is superimposed on the light-permeable area of said other section so that the received light is a measure of the relative displacement of said first and second elements.

9. In a measuring apparatus, in combination, encoding means comprising a first element and a second element, one of said elements being movable in one direction relative to the other element; a code member supported on said first element, said code member having a set of graduation sections of uniform length extending in said direction, each section having a light-permeable area and an opaque area, said light-permeable areas and opaque areas of said set of sections alternating in said direction, the length of the light-permeable area being one quarter of the length of the section; optical means supported on said second element on one side of said code member and optically connecting at least two spaced sections of said set of sections for projecting rays of light passing through the light-permeable area of each of said two sections onto the other of said two sections; a source of light supported on said second element on the other side of said code member in a position for projecting light of on one of said two sections so that light passes through the light-permeable area of said one section and an image of of the light-permeable area of said one section is formed by said optical means on the other of said two sections; and photo-detector means supported on said second element on said other side of said code member spaced in said one direction from said source of light and located in the region of said other section to receive the light of the image only where the same is superimposed on the light-permeable area of said other section so that the received light is a measure of the relative displacement of said first and second elements.

10. In a measuring apparatus, in combination encoding means comprising a first element and a second element, one of said elements being movable in one direction relative to the other element; a code member on said first element, said code member having a set of graduation sections of uniform length extending in said direction, each section having a light-permeable area and an opaque area; optical means on said second element optically connecting at least two spaced sections of said set of sections; a source of light on said second element for projecting light on one of said two sections so that light passes through the light-permeable area of said one section and an image of the light-permeable area of said one section is formed by said optical means on the other of said two sections; and photo-detector means on said second element spaced in said one direction from said source of light and located in the region of said other section to receive the lght of the image only where the same is superimposed on the light-permeable area of said other section so that the received light is a measure of the relative displacement of said first and second elements.

11. In a measuring apparatus, in combination, encoding means comprising a first element and a second element, one of said elements being movable in one direction relative to the other element; a code member supported on said first element, said code member having a plurality of sets of graduation sections, the sections of each set having uniform lengths different from the lengths of the sections of the other sets, each section having a light-permeable area and an opaque area, said light-permeable areas and opaque areas of each of said sets of sections being alternately disposed in said direction and said sets of sections extending parallel to each other in said direction; optical means supported on said second element on one side of said code member and optically connecting one group of sections including at least one section of each set of sections to another group of sections spaced in said direction from said one group of sections, said other group of sections including at least one other section of each set of sections so that rays of light passing through the light-permeable areas of each section of each group are projected onto a section of the other group belonging to the same set; a source of light supported on said second element on the other side of said code member in a position for projecting light on one of said groups of sections so that images of said light-permeable areas of said one group of sections are projected by said optical means onto the other group of sections; and a photo-detector including a plurality of light-responsive means supported on said second element on said other side of said code member spaced in said direction from said source of light and located in the region of said other group of sections, each light-responsive means being located in the region of one of said sets to receive the light of an image only where the same is superimposed on the light-permeable area of a section of the other group belonging to the same set so that the received light is a measure of the relative displacement of said first and second elements.

12. In a measuring apparatus, in combination, encoding means comprising a first element and a second element, one of said elements being movable in one direction relative to the other element; a code member supported on said first element, said code member having a plurality of sets of graduation sections, the sections of each set having uniform lengths different from the lengths of the sections of the other sets, each section having a light-permeable area and an opaque area, said light-permeable areas and opaque areas of each of said sets of sections being alternately disposed in said direction and said sets of sections extending parallel to each other in said direction; optical means supported on said second element on one side of said code member and optically connecting one group of sections including a series of sections of each set of sections to another group of sections spaced in said direction from said one group of sections, said other group of sections including another series of sections of each set of sections so that rays of light passing through the light-permeable areas of each series of sections of each group are projected onto a series of sections of the other group belonging to the same set; a source of light supported on said second element on the other side of said code member in a position for projecting light on one of said groups of sections so that images of said light-permeable areas of said one group of sections are projected by said optical means onto the other group of sections; and a photo-detector including a plurality of light-responsive means supported on said second element on said other side of said code member spaced in said direction from said source of light and located in the region of said other group of sections, each light-responsive means extending over a series of sections of one of said sets to receive the light of images only where the same are superimposed on the light-permeable areas of sections of the other group belonging to the same set so that the received light is a measure of the relative displacement of said first and second elements.

13. In a measuring apparatus, in combination, encoding means comprising a first element and a second element, one of said elements being turnable relative to the other element; a code member supported on said first element, said code member having a plurality of sets of graduation sections, the sections of each set having uniform lengths different from the lengths of the sections of the other sets, each section having a light-permeable area and an opaque area, said light-permeable areas and opaque areas of each of said sets of sections being alternately disposed in circumferential direction and said sets of sections extending parallel to each other in circumferential direction; optical means supported on said second element on one side of said code member and optically connecting one group of sections including at least one section of each set of sections to another group of sections diametrically spaced in circumferential direction from said one group of sections, said other group of sections including at least one other section of each set of sections so that rays of light passing through the light-permeable areas of each section of each group are projected onto a section of the other group belonging to the same set; a source of light supported on said second element on the other side of said code member in a position for projecting light on one of said groups of sections so that images of said light-permeable areas of said one group of sections are projected by said optical means onto the other group of sections; and a photo-detector including a plurality of light-responsive means supported on said second element on said other side of said code member diametrically spaced in circumferential direction from said source of light and located in the region of said other group of sections, each light-responsive means being located in the region of one of said sets to receive the light of an image only where the same is superimposed on the light-permeable area of a section of the other group belonging to the same set so that the received light is a measure of the relative displacement of said first and second elements.

14. In a measuring apparatus, in combination, encoding means comprising a first element and a second element, said first element being turnable relative to the other element; a circular code disk supported on said first element, said code member having a plurality of circular sets of graduation sections, the sections of each set having uniform lengths different from the lengths of the sections of the other sets, each section having a light-permeable area and an opaque area, said light-permeable areas and opaque areas of each of said sets of sections being alternately disposed in circumferential direction and said sets of sections being concentric with the axis of rotation of said first element; optical means supported on said second element on one side of said code disk and optically connecting one group of sections including at least one section of each set of sections to another group of sections diametrically spaced in circumferential direction from said one group of sections, said other group of sections including at least one other section of each set of sections so that rays of light passing through the light-permeable areas of each section of each group are projected onto a section of the other group belonging to the same set; a source of light supported on said second element on the other side of said code disk in a position for projecting light on one of said groups of sections so that images of said light-permeable areas of said one group of sections are projected by said optical means onto the other group of sections; and a photo-detector including a plurality of light-responsive means supported on said second element on said other side of said code disk diametrically spaced in circumferential direction from said source of light and located in the region of said other group of sections, each light-responsive means being located in the region of one of said sets to receive the light of an image only where the same is superimposed on the light-permeable area of a section of the other group belonging to the same set so that the received light is a measure of the relative displacement of said first and second elements.

15. In a measuring apparatus, in combination, encoding means comprising a first element and a second element, one of said elements being movable in one rectilinear direction relative to the other element; a code member supported on said first element, said code member having a plurality of sets of graduation sections, the sections of each set having uniform lengths different from the lengths of the sections of the other sets, each section having a light-permeable area and an opaque area, said light-permeable areas and opaque areas of each of said sets of sections being alternately disposed in said direction and said sets of sections extending parallel to each other in said direction; optical means supported on said second element on one side of said code member and having two spaced portions optically connecting one group of sections including at least one section of each set of sections to another group of sections spaced in said direction from said one group of sections, said other group of sections including at least one other section of each set of sections so that rays of light passing through the light-permeable areas of each section of each group are projected onto a section of the other group belonging to the same set; a source of light supported on said second element on the other side of said code member in a position for projecting light on one of said groups of sections so that images of said light-permeable areas of said one group of sections are projected by said optical means onto the other group of sections; and a photo-detector including a plurality of light-responsive means supported on said second element on said other side of said code member spaced in said direction from said source of light and located in the region of said other group of sections, each light-responsive means being located in the region of one of said sets to receive the light of an image only where the same is superimposed on the light-permeable area of a section of the other group belonging to the same set so that the received light is a measure of the relative displacement of said first and second elements.

16. In a measuring apparatus, in combination, encoding means comprising a first element and a second element, said first element being turnable relative to the other element; a circular code disk supported on said first element, said code member having a plurality of circular sets of graduation sections, the sections of each set having uniform lengths different from the lengths of the sections of the other sets, each section having a light-permeable area and an opaque area, said light-permeable areas and opaque areas of each of said sets of sections being alternately disposed in circumferential direction and said sets of sections being concentric with the axis of rotation of said first element; optical prism means supported on said second element on one side of said code disk extending diametrically across said code disk and optically connecting one group of sections including at least one section of each set of sections to another group of sections diametrically spaced in circumferential direction from said one group of sections, said other group of sections including at least one other section of each set of sections so that rays of light passing through the light-permeable areas of each section of each group are projected onto a section of the other group belonging to the same set; a source of light supported on said second element on the other side of said code disk in a position for projecting light on one of said groups of sections so that images of said light-permeable areas of said one group of sections are projected by said optical means onto the other group of sections; and a photo-detector including a plurality of light-responsive means supported on said second element on said other side of said code disk diametrically spaced in circumferential direction from said source of light and located in the region of said other group of sections, each light-responsive means being located in the region of one of said sets to receive the light of an image only where the same is superimposed on the light-permeable area of a section of the other group belonging to the same set so that the received light is a measure of the relative displacement of said first and second elements.

17. A measuring apparatus as set forth in claim 16, wherein each section and each light-permeable area of each set is half the length of each section and of each light-permeable area, respectively, of the adjacent set located inwardly thereof.

18. In a measuring apparatus, in combination, encoding means comprising a first element and a second element, one of said elements being movable in one direction relative to the other element; a code member supported on said first element, said code member having a plurality of sets of graduation sections, the sections of each set having uniform lengths different from the lengths of the sections of the other sets, each section having a light-permeable area and an opaque area, said light-permeable areas and opaque areas of each of said sets of sections being alternately disposed in said direction and said sets of sections extending parallel to each other in said direction, each section and each light-permeable area of each set having half the length of each section, and of each light-permeable area, respectively, of an adjacent set; optical means supported on said second element on one side of said code member and optically connecting one group of sections including at least one section of each set of sections to another group of sections spaced in said direction from said one group of sections, said other group of sections including at least one other section of each set of sections so that rays of light passing through the light-permeable areas of each section of each group are projected onto a section of the other group belonging to the same set; a source of light supported on said second element on the other side of said code member in a position for projecting light on onee of said groups of sections so that images of said light-permeable areas of said one group of sections are projected by said optical means onto the other group of sections; and a photo-detector including a plurality of light-responsive means supported on said second element on said other side of said code member spaced in said direction from said source of light and located in the region of said other group of sections, each light-responsive means being located in the region of one of said sets to receive the light of an image only where the same is superimposed on the light-permeable area of a section of the other group belonging to the same set so that the received light is a measure of the relative displacement of said first and second elements.

19. Apparatus as set forth in claim 18, wherein the length of each light-permeable area is one quarter of the length of the respective section of the respective set.

20. Apparatus as set forth in claim 18, wherein said code member includes a transparent plate and a layer of opaque material thereon, said layer having openings constituting said light-permeable areas.

References Cited in the file of this patent

UNITED STATES PATENTS 2,793,807     Yaeger _____ May 28, 1957